Feb. 26, 1952  L. S. PETERSEN  2,587,379
APPARATUS FOR TREATING BULK MATERIAL
Filed Nov. 25, 1950  2 SHEETS—SHEET 2
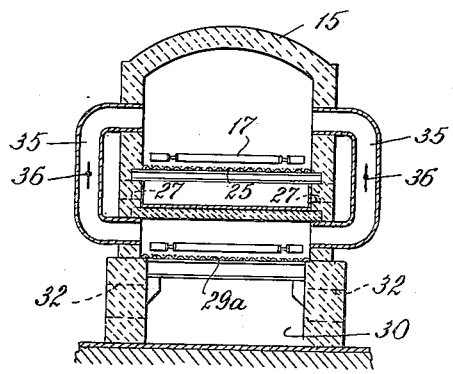
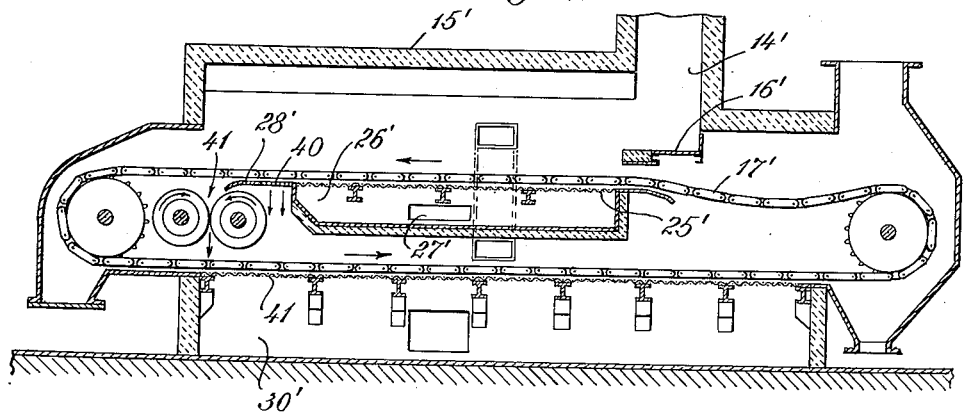
INVENTOR
Louis S. Petersen
BY
ATTORNEYS Patented Feb. 26, 1952

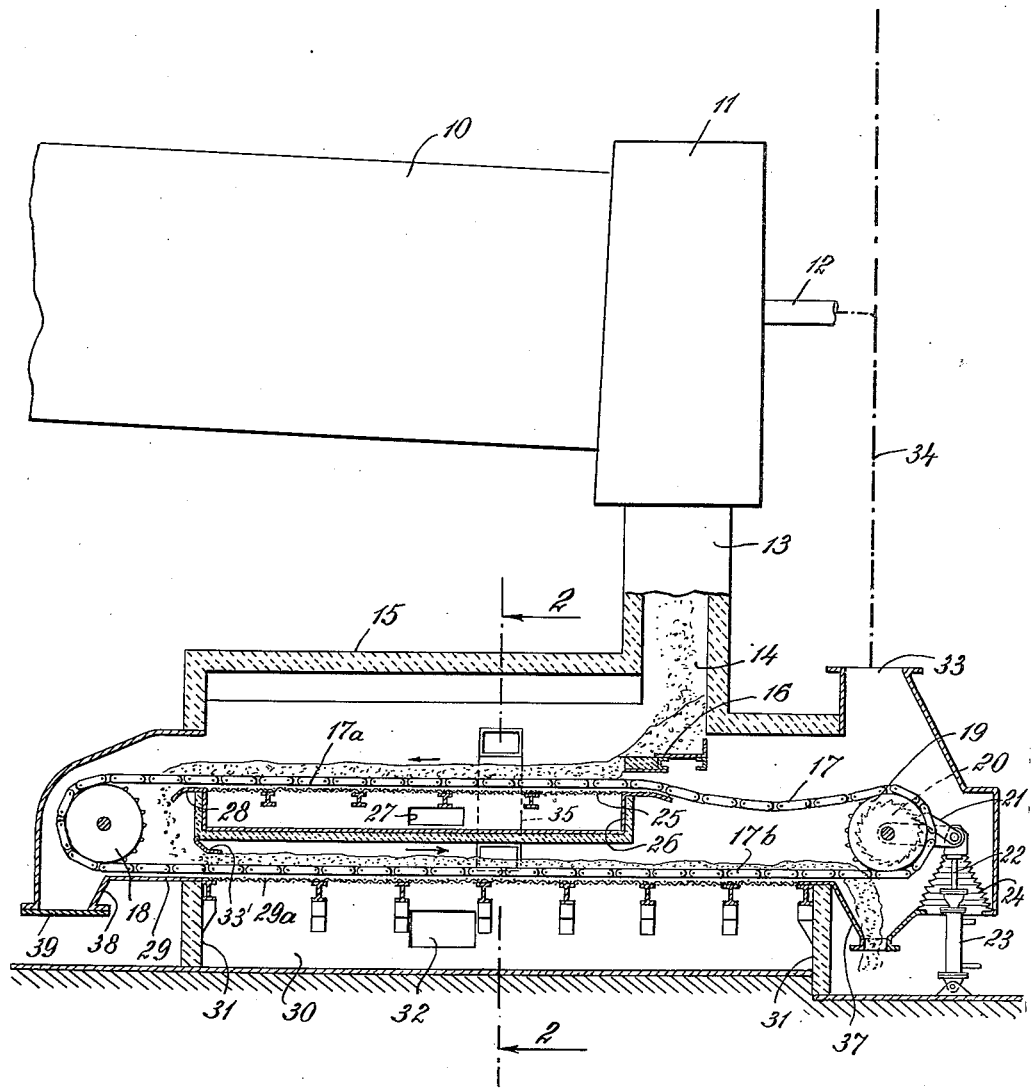

2,587,379

UNITED STATES PATENT OFFICE 2,587,379

APPARATUS FOR TREATING BULK MATERIAL

Louis Steffen Petersen, Forest Hills, N. Y., assignor to F. L. Smidth & Co., New York, N. Y., a corporation of New Jersey Application November 25, 1950, Serial No. 197,564
In Denmark December 30, 1949

8 Claims. (Cl. 263—32)

This invention relates to the treatment of bulk material by means of gases and is concerned more particularly with a novel apparatus including an endless, gas-permeable conveyor having oppositely moving stretches for advancing layers of material, which are treated by the passage of gases therethrough.

The treatment of bulk material with gases is used in many industries, such as the metallurgic and cement industries, for the purpose of preheating, calcining, sintering, or reducing raw materials, such as ore, cement, raw materials, lime, etc., and also for the cooling of materials, such as agglomerated ores, slag, cement, clinker, etc. In addition to the treatment of bulk materials with gases for the purpose of heating or cooling the materials, the treatments are sometimes used for effecting chemical changes in the materials, as in the artificial aging of cement by blowing carbonic acid gas through it, and also for purifying the gases by freeing them from entrained dust particles, which are retained in the layer of material through which the gases pass.

In the treatment of bulk materials with gases for any of the purposes above mentioned, it is important to effect the treatment of large quantities of material per unit of time in a simple and reliable manner. In the apparatus of the invention, the desired results are obtained by utilizing an endless conveyor and advancing the material by both stretches of the conveyor with the gases passing through one or both layers of material on the stretches. In such apparatus, a highly effective treatment is obtained, since the effective area for treatment is approximately twice that heretofore utilized in apparatus, in which materials are subjected to gas treatment, while being advanced by a conveyor.

In the apparatus of the invention, the gases are separately supplied to the layers of material being advanced by the two stretches of the conveyor and thus the material in either or both layers may be treated as desired and different gases may be used for treating the material in the two layers. The material being treated on the two stretches of the conveyor need not be the same, but, if the material is first treated on one stretch and then on the other, it is preferable to employ a conveyor of the chain type having large gaps between adjacent cross-bars and to support the material being advanced by each stretch of the conveyor on a gas-permeable support. As the material is advanced past the end of the support beneath the first stretch of the conveyor, the material may then pass through the conveyor and be deposited upon the second support. The material leaving the first stretch of the conveyor may pass to a crushing device, which discharges the crushed material on the second stretch of the conveyor and this is advantageous, since the crushing operation then requires the use of no additional equipment except the crushing device and no difficulties are encountered in conveying the material to and from this device, as a result, for example, of the high temperature of the material. When gas-permeable supports, as above described, are employed, the crushing device may be mounted at the end of the first support to receive the material discharged therefrom through the conveyor.

In the new apparatus, the gases for treating the materials on the two stretches of the conveyor are supplied to boxes lying beneath the respective stretches and the gases are withdrawn from the spaces above the stretches. Means are then provided for preventing the gas, which has passed through the material in one stretch, from passing through the material in the other stretch. When the conveyor is of the type, with which gas permeable supports are employed, these supports form the upper walls of the boxes to which the gases are supplied.

In a form of the new apparatus for use in cooling materials discharged from a rotary kiln, the apparatus includes a chamber having an inlet connected by a chute to the discharge hood of the kiln. The material entering the chamber through the inlet is deposited upon the upper stretch of the conveyor and is cooled by air, which passes through the stretch of the conveyor from beneath and through the material being advanced thereby. The heated air then flows up the chute and through the hood into the kiln, where the air serves as secondary air for combustion. The material discharged from the first stretch of the conveyor is advanced along the second stretch, where it is finally cooled by air passing through the second stretch from beneath and through the layer of material being advanced thereby. The air used in the second or low temperature cooling may then be withdrawn and discharged into the atmosphere, but, preferably, at least part of the air heated in the low temperature stage of cooling is passed to the burner pipe and utilized as preliminary combustion air. Also, if desired, part of the air heated in the low temperature cooling stage may be conducted into the space within the chamber above the first stretch of the conveyor and passed through the chute into the kiln to serve as secondary combustion air. The relative amounts of heated air, which are used as preliminary and secondary combustion air, may be regulated, so that suitable supplies of air at proper temperatures for these purposes can be provided.

For a better understanding of the invention, reference may be made to the accompanying drawings, in which:

Fig. 1 is a view in vertical longitudinal section of one form of the new apparatus installed in connection with a rotary kiln shown partly in elevation;

Fig. 2 is a sectional view on the line 2—2 of Fig. 1; and

Fig. 3 is a vertical sectional view of a modified form of the apparatus.

The installation shown in Fig. 1 includes a rotary kiln 10 of the type used in the burning of cement and the discharge end of the kiln extends into a hood 11. A burner pipe 12 for supplying a fuel-air mixture projects through the wall of the hood and a clinker chute 13 leads downwardly from the hood to the inlet 14 of a chamber 15. A platform 16 lies beneath the lower end of the chute within the chamber and the clinker discharged through the chute collects on the platform, until the upper surface of the pile of accumulated material reaches the angle of repose, after which additional material discharged from the chute slides down the pile and off the platform.

An endless conveyor 17 of the chain type is trained about toothed wheels 18, 19 within the chamber and the wheels 19 are advanced by a ratchet mechanism of conventional form, which includes a ratchet wheel 20 fast on the shaft of wheels 19 and a pawl 21 operated by the piston rod 22 of a piston within a cylinder 23 pivoted at its lower end. Fluid supplied above and below the piston in cylinder 23 causes movements of the pawl, which advance the ratchet wheel and conveyor chain with a stepwise movement. The opening into the chamber, through which the ratchet mechanism extends, is closed by a sealing device 24.

The upper stretch 17a of the conveyor travels beneath platform 16 and over a perforated support 25, which receives material dropping from the pile on the platform and forms the top wall of a wind box 26, to which air is supplied through an inlet 27. At the end of the box toward which the material is advanced, there is mounted a plate 28 having a downwardly turned free edge and the material advanced over the plate by the conveyor drops through the conveyor and is deposited upon a lower support 29 lying beneath the lower stretch 17b of the conveyor. The support 29 has a perforated portion 29a forming the top of a wind box 30 defined in part by walls 31 of the chamber and having an air inlet 32. Air, which has flowed from box 30 through the lower stretch of the conveyor and the material advanced thereby to enter the space above the material, is kept from traveling from the space to the left (Fig. 1) by a baffle 33' attached to box 26 and resting upon the top of the layer of material on the conveyor stretch 17b. Air may escape, from the chamber through the air outlet 33 and part of the air issuing through the outlet may be supplied to burner tube 12 by the connection indicated diagrammatically at 34 and the remainder may be discharged to the atmosphere, or the air discharged through outlet 33 may be employed for any desired purpose.

In the apparatus shown in Fig. 1, the space above the layer of material on the lower stretch 17b of the conveyor is connected to the space above the material on the upper stretch 17a by ducts 35, each containing a damper 36. By adjustment of the dampers, it is possible to pass a selected amount of the air, which has been heated by passing through the material on the lower stretch of the conveyor, into the space above the upper stretch and this air then passes up chute 13 and is utilized with the air, which is passed through the material on the upper stretch of the conveyor, as secondary air for combustion. Air entering the space above the material on the upper stretch 17a of the conveyor is prevented from escaping to outlet 33 by the layer of material flowing from platform 16 upon stretch 17a.

A hopper 37 is mounted at the end of the wind box 30, toward which the material is advanced, by the lower stretch 17b of the conveyor, and, when the material has passed beyond the end of the box, it drops through the conveyor and enters the hopper to be discharged. At the opposite end of the conveyor beneath toothed wheels 18, the chamber is provided with a hopper 38 normally closed by a plate 39 and material, which may not have passed through the upper stretch of the conveyor to fall upon support 29, is collected in hopper 38 and removed from time to time.

The apparatus in the form shown in Fig. 3 is generally similar to that shown in Fig. 1 and includes a chamber 15' having an inlet 14', through which material is deposited upon a platform 16' and flows therefrom to the upper stretch of a conveyor 17'. This stretch of the conveyor advances the material along a gas-permeable support forming the top of a wind box 26' having an air inlet 27'. A plate 28' is mounted beneath the conveyor at the end of box 26', toward which the material is being advanced, and the plate has a perforated section 40 serving as a screen, through which finely divided material may pass to a perforated support 41 forming the top of a wind box 30'. Material of too large a size to pass through the openings in section 40 of plate 28' is discharged from the plate to a crushing device 41 and the crushed material issuing from the device drops upon support 41 and is carried along the support by the lower stretch of the conveyor. In other respects, the apparatus shown in Fig. 3 is similar to that shown in Fig. 1 as above described.

Reference is made to applicant's co-pending application Ser. No. 197,563, filed November 25, 1950, Method of Cooling Bulk Material, which relates to a method, which may be practiced by the use of the apparatus disclosed in the present application.

I claim:

1. An apparatus for treatment of bulk material by gases, which comprises a chamber, an endless gas-permeable conveyor having oppositely moving stretches within the chamber, means for depositing material upon the first stretch of the conveyor, means for directing the material from the end of the first stretch upon the beginning of the second, an outlet from the chamber for material delivered by the second stretch of the conveyor, separate means disposed beneath the respective stretches of the conveyor for passing gas through each stretch and the material thereon, and means for preventing gas, which has passed through one stretch of the conveyor, from passing through the other.

2. An apparatus for treatment of bulk material by gases, which comprises a chamber, having an inlet and an outlet for material and an outlet for gas, an endless gas-permeable conveyor having oppositely moving stretches within the chamber, the first stretch receiving material from the inlet and the second stretch delivering the material to the material outlet, means for directing the material from the end of the first stretch upon the beginning of the second, separate means disposed beneath the respective stretches of the conveyor for passing gas through each stretch and the material thereon, and means for preventing gas, which has passed through one stretch of the conveyor, from passing through the other, the gas supplied to one stretch escaping through the inlet and at least part of the gas supplied to the second stretch escaping through the gas outlet.

3. An apparatus for treatment of bulk material by gases, which comprises a chamber having an inlet and an outlet for material and an outlet for gas, an endless gas-permeable conveyor having oppositely moving stretches within the chamber, the first stretch receiving material from the inlet and the second stretch delivering the material to the material outlet, means for directing the material from the end of the first stretch upon the beginning of the second, separate means disposed beneath the respective stretches of the conveyor for passing gas through each stretch and the material thereon, means for preventing gas, which has passed through one stretch of the conveyor, from passing through the other, the gas passing through the first stretch escaping through the inlet and part of the gas passing through the second stretch escaping through the gas outlet, and means for conducting the remainder of the gas passing through the second stretch to the inlet to escape therethrough.

4. An apparatus for treatment of bulk material by gases, which comprises a chamber having an inlet and an outlet for material and an outlet for gas, an endless gas-permeable conveyor having oppositely moving stretches within the chamber with the first stretch lying beneath the inlet to receive material therefrom and the second overlying the material outlet to deliver material thereto, separate means disposed beneath the respective stretches of the conveyor for passing gas through each stretch and the material thereon, and means for preventing gas, which has passed through one stretch of the conveyor from passing through the other, the gas passing through the first stretch escaping through the inlet and at least part of the gas passing through the second stretch escaping through the gas outlet.

5. An apparatus for treatment of bulk material by gases, which comprises a chamber having an inlet and an outlet for material and an outlet for gas, a gas-permeable support within the chamber adjacent the inlet for receiving material therefrom, a second gas-permeable support within the chamber below the first support and adjacent the material outlet, a conveyor having oppositely moving stretches for advancing material along the supports, the material falling through the conveyor from the end of the first support upon the second, separate means for passing gas through the respective supports and the material thereon, and means for preventing gas, which has passed through one support, from passing through the other, the gas supplied to the first support escaping through the inlet and at least part of the gas supplied to the second support escaping through the gas outlet.

6. An apparatus for treatment of bulk material by gases, which comprises a chamber having an inlet and an outlet for material and an outlet for gas, a gas-permeable support within the chamber adjacent the inlet for receiving material therefrom, a second gas-permeable support within the chamber below the first support and adjacent the material outlet, a conveyor having oppositely moving stretches for advancing material along the supports, crushing means receiving the material at the end of the first support and delivering the crushed material upon the second support, separate means for passing gas through the respective supports and the material thereon, and means for preventing gas, which has passed through one support, from passing through the other, the gas supplied to the first support escaping through the inlet and at least part of the gas supplied to the second support escaping through the gas outlet.

7. Apparatus for cooling bulk material discharged from a kiln after having been burned therein by combustion of a fuel-air mixture, which comprises the combination of a kiln having a hood at its discharge end and a burner pipe projecting through the wall of the hood and supplied with a fuel-air mixture, a chamber having an inlet connected to the hood to receive material discharged from the kiln, the chamber also having outlets for material and air, respectively, an endless gas-permeable conveyor having oppositely moving stretches within the chamber, the first stretch receiving material entering the chamber through the inlet and the second stretch receiving the material from the first and delivering the material to the material outlet, separate means for passing air through the respective stretches of the conveyor and the material thereon, means for preventing air, which has passed through one stretch of the conveyor, from passing through the other, the air passing through the first stretch of the conveyor escaping through the inlet and into the kiln through the hood to serve as secondary air for combustion and at least part of the air passing through the second stretch escaping through the air outlet, and means for conducting air issuing from the air outlet to the burner pipe to serve as primary combustion air.

8. Apparatus for cooling bulk material discharged from a kiln after having been burned therein by combustion of a fuel-air mixture, which comprises the combination of a kiln having a hood at its discharge end and a burner pipe projecting through the wall of the hood and supplied with a fuel-air mixture, a chamber having an inlet connected to the hood to receive material discharged from the kiln, the chamber also having outlets for material and air, respectively, an endless gas-permeable conveyor having oppositely moving stretches within the chamber, the first stretch receiving material entering the chamber through the inlet and the second stretch receiving the material from the first and delivering the material to the material outlet, separate means for passing air through the respective stretches of the conveyor and the material thereon, means for preventing air, which has passed through one stretch of the conveyor, from passing through the other, the air passing through the first stretch of the conveyor escaping from the space above the stretch through the inlet and hood into the kiln to serve as secondary air for combustion and part of the air passing through the second stretch of the conveyor escaping from the space above the stretch through the air outlet, means for connecting the spaces above the stretches of the conveyor for passage of air passing through the second stretch to the inlet, and means for connecting the gas outlet from the chamber to the burner pipe.

LOUIS STEFFEN PETERSEN.

REFERENCES CITED

The following references are of record in the file of this patent:

UNITED STATES PATENTS

| Number | Name | Date |
| --- | --- | --- |
| 1,515,596 | Harris | Nov. 18, 1924 |
| 2,041,142 | Norvig | May 19, 1936 |
| 2,335,611 | Pray | Nov. 30, 1943 |